J. H. L. DE BATS.
METHOD OF MAKING HIGH SPEED CUTTING TOOLS.
APPLICATION FILED JAN. 30, 1920.

1,415,021.                                                 Patented May 9, 1922.

Inventor:
Jean H. L. De Bats
by Geo. H. Benjamin

UNITED STATES PATENT OFFICE.

JEAN H. L. DE BATS, OF WHITMAN, MASSACHUSETTS, ASSIGNOR, BY MESNE ASSIGNMENTS, TO ANATMOS METALS AND FURNACE CORPORATION, OF NEW YORK, N. Y., A CORPORATION OF DELAWARE.

METHOD OF MAKING HIGH-SPEED CUTTING TOOLS.

1,415,021. Specification of Letters Patent. Patented May 9, 1922.

Application filed January 30, 1920. Serial No. 355,111.

*To all whom it may concern:*

Be it known that I, JEAN H. L. DE BATS, a subject of the Queen of Holland, residing in Whitman, in the county of Plymouth and State of Massachusetts, United States of America, have invented an Improvement in Methods of Making High-Speed Cutting Tools, of which the following description, in connection with the accompanying drawings, is a specification, like characters on the drawings representing like parts.

This invention relates to a novel method of making high speed cutting tools. The composite high speed cutting tool is composed of a member of relatively soft metal such as steel or wrought iron low in carbon, and a harder member composed of an alloy of metals having abrasive and cutting qualities, which is united with the softer metal member and is preferably enveloped by the latter for a portion of the length of the former, said harder metal member being exposed on a plurality of surfaces which cooperate to provide the harder metal member with a cutting edge.

The invention is especially designed to be embodied in a high speed cutting tool, in which the harder or cutting member is composed of an alloy which can be united or welded to the softer metal member and retain its hardness and cutting qualities. Such an alloy may be composed in whole or in part of tungsten, chromium, cobalt, vanadium, nickel or like metals.

The softer metal member may be used as a metal mold in which the harder metal member is united with it as will be described.

These and other features of this invention will be pointed out in the claims at the end of this specification.

Figure 1:
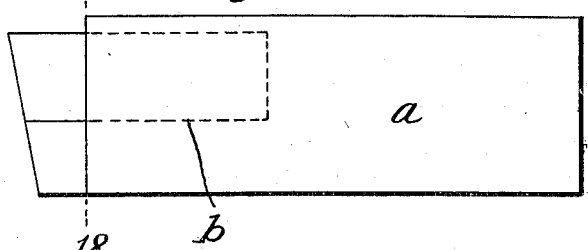

Fig. 1 represents one form of high speed cutting tool embodying this invention.

Figure 2:
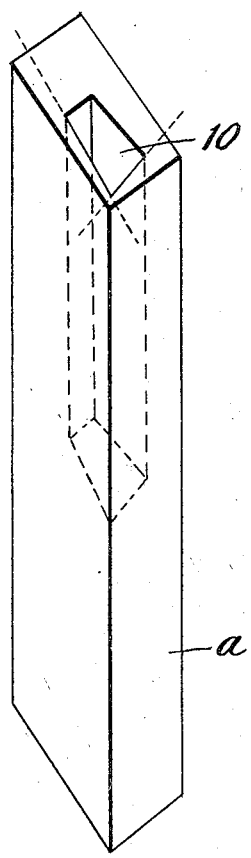

Fig. 2, a perspective view of the softer member shown in Fig. 1 in an upright position ready to receive the harder member.

Figure 3:
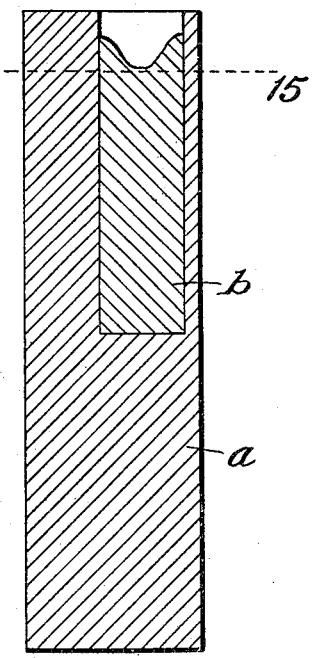

Fig. 3, a vertical longitudinal section of the two members to illustrate the welding or union of the same.

Figure 5:
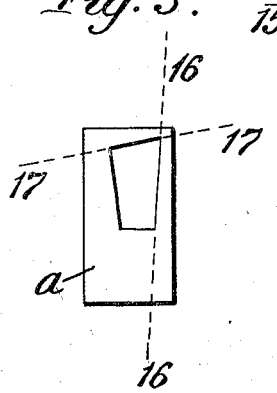
Figure 4:
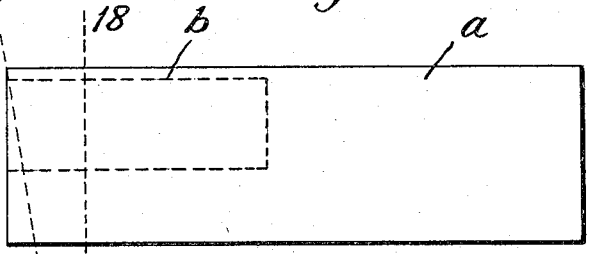

Fig. 4, a side elevation of the composite bar formed by the welding of the two members, and Fig. 5, an end elevation of the bar shown in Fig. 4 looking toward the right.

Referring to the drawing $a$ represents the softer metal member and $b$ the harder metal member of the improved cutting tool.

The member $a$ may be of any desired shape and is herein shown as oblong and comprises a bar of steel or wrought iron low in carbon, which is provided with a cavity 10 extended from one end thereof for a portion of the length of said bar, depending upon the length of the hard member $b$.

The cavity 10 may be machined, drilled or otherwise formed in the bar $a$, which is then used as a mold for the harder member $b$, which latter may be placed in the cavity in solid form or may be poured therein in liquid form.

When the member $b$ in solid form is used, a piece thereof of suitable length is placed in the mold or bar $a$, preferably together with a suitable amount of flux, such for instance, as powdered glass, and the parts thus assembled are placed in a suitable furnace and subjected to a heat sufficiently high to melt the harder member $b$, which is of such character as to be rendered molten at a temperature lower than the melting point of the member $a$.

The parts are allowed to remain in the furnace until the bar $a$ is at a white heat and when this occurs, the member $b$ will have assumed a molten state and is welded or united to the bar $a$, whereupon the composite bar thus formed and represented in Fig. 3, is removed from the furnace and allowed to cool.

It is preferred to make the cavity 10 of suitable depth and to use such a length of the harder metal member $b$, as to have the latter metal when melted settled below the upper edge of the cavity after the manner represented in Fig. 3, so that when the metals have cooled down, the upper end of the bar $a$ which projects above the member $b$ together with a portion of the latter, may be cut off on or about the line 15, Fig. 3, and provide the composite bar with a smooth end, of which the member $b$ forms a part, as represented in Figs. 4 and 5.

The composite bar is then subjected to further treatment to remove a portion of the softer member $a$ and expose a plurality of surfaces of the harder member $b$ and provide the latter with a cutting edge, and thus form a high speed cutting tool, one form of which is shown in Fig. 1.

In Fig. 5, the lines 16, 17, represent the planes on which the soft metal is removed to expose the hard metal b on the front side and top of the tool, and in Figs. 1 and 4, the line 18 indicates the length of the soft metal which is removed, while the line 19 indicates the amount of metal removed to provide the tool with an inclined front face.

The softer metal a may be removed so as to expose the desired length of the harder alloy or member b, by grinding or cutting. By reference to Fig. 1, it will be seen that the softer metal a forms a protecting cover for the greater length of the harder member, which enables the tool to be inserted in the tool post of the lathe and fastened by a set screw engaging the softer metal without danger of fracturing the more brittle harder member b.

The harder member b of the tool may and preferably will be composed of an alloy of metals including one or more of the metals above specified, and when used in solid form the alloy in the cavity 10 need be heated only to a temperature high enough to render it sufficiently molten to settle in the cavity and unite with the walls thereof after the manner represented in Fig. 3.

In manufacturing the hard members b for use with the member a it is desirable that it should be melted at a high temperature to render it very liquid and then be quickly poured or cast in bits or bars in chilled molds, and when these bits or bars are melted down in the cavities 10 of the bars or members a, a materially lower temperature can be used to render the member b sufficiently molten to unite with the walls of the cavities. As a result of this reheating of the alloy of metals forming the member b, a much tougher metal free from segregation and blow holes and retaining the hardness and cutting qualities of the alloy will be obtained. While it is preferred to melt the alloy in the cavity 10 of the member a, it is not desired to limit the invention in this respect as good results may be obtained by pouring the alloy into the cavity 10 in sufficient quantity to provide for the settling of the molten metal in the cavity.

The tool herein described is especially designed for use in cutting metals revolving at speeds, and as soon as the exposed portion of the harder alloy or member b has been used up, a new portion is exposed by removing the softer metal of the member a which covers the same.

I have herein shown one form of tool embodying the invention but it is not desired to limit the invention to any particular form of tool.

Claims:

1. The method of making high speed cutting tools, which consists in forming a cavity in a steel or iron bar low in carbon, placing in said cavity a piece of alloy which is relatively hard and of lower melting point than said iron or steel bar, heating the parts thus assembled to effect a weld or union of the same, cooling the composite bar thus formed, and removing a portion of the iron or steel to uncover a portion of the harder alloy.

2. The method of making high speed cutting tools, which consists in subjecting an iron or steel bar low in carbon and containing an alloy of metals which is relatively harder but of a lower melting point than said iron or steel bar, to a heat lower than the melting point of said iron or steel bar but sufficiently high to melt the said alloy and cause it to unite with the iron or steel, cooling the united metals and removing a portion of the iron or steel to expose the alloy.

In testimony whereof, I have signed my name to this specification.

JEAN H. L. DE BATS.